United States Patent
Seo

(10) Patent No.: US 10,455,479 B2
(45) Date of Patent: Oct. 22, 2019

(54) METHOD FOR RELAYING DISCOVERY SIGNAL FOR TERMINAL-TO-TERMINAL DIRECT COMMUNICATION IN WIRELESS COMMUNICATION SYSTEM, AND APPARATUS THEREFOR

(71) Applicant: LG ELECTRONICS INC., Seoul (KR)

(72) Inventor: Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/308,209

(22) PCT Filed: Jun. 8, 2015

(86) PCT No.: PCT/KR2015/005714
§ 371 (c)(1),
(2) Date: Nov. 1, 2016

(87) PCT Pub. No.: WO2015/190778
PCT Pub. Date: Dec. 17, 2015

(65) Prior Publication Data
US 2017/0086125 A1    Mar. 23, 2017

Related U.S. Application Data

(60) Provisional application No. 62/011,001, filed on Jun. 11, 2014.

(51) Int. Cl.
*H04W 76/14* (2018.01)
*H04W 72/04* (2009.01)
(Continued)

(52) U.S. Cl.
CPC ......... *H04W 40/246* (2013.01); *H04W 40/20* (2013.01); *H04W 40/24* (2013.01);
(Continued)

(58) Field of Classification Search
CPC ... H04W 40/20; H04W 40/24; H04W 40/246; H04W 72/04; H04W 76/023;
(Continued)

(56) References Cited

U.S. PATENT DOCUMENTS

| 2008/0165761 A1* | 7/2008 | Goppner ................ H04B 7/269 370/350 |
| 2011/0149799 A1 | 6/2011 | Wu et al. |

(Continued)

FOREIGN PATENT DOCUMENTS

| CN | 103582077 A | 2/2014 |
| EP | 2517488 B1 | 11/2013 |

(Continued)

OTHER PUBLICATIONS

3GPP, "3rd Generation Partnership Project; Technical Specification Group Radio Access Network; Study on LTE Device to Device Proximity Services; Radio Aspects (Release 12)," 3GPP TR 36.843 V12.0.1, Mar. 2014, pp. 1-50.

(Continued)

*Primary Examiner* — Erica Navar
(74) *Attorney, Agent, or Firm* — Birch, Stewart, Kolasch & Birch, LLP

(57) ABSTRACT

Disclosed in the present application is a method, by a terminal, for relaying a discovery signal for terminal-to-terminal direct communication in a wireless communication system. Particularly, the method comprises the steps of: detecting a plurality of discovery signals transmitted from the same source terminal; determining whether to relay one of the plurality of discovery signals on the basis of a first hop count included in the plurality of discovery signals; and when it is determined to relay the one discovery signal, relaying the one discovery signal to another terminal, wherein a second hop count included in the one discovery signal to be relayed increase or decreases on the basis of the first hop count.

10 Claims, 10 Drawing Sheets

(51) Int. Cl.
*H04W 40/20* (2009.01)
*H04W 40/24* (2009.01)
*H04W 88/04* (2009.01)
*H04W 8/00* (2009.01)
*H04W 84/18* (2009.01)

(52) U.S. Cl.
CPC ........... *H04W 72/04* (2013.01); *H04W 76/14* (2018.02); *H04W 8/005* (2013.01); *H04W 84/18* (2013.01); *H04W 88/04* (2013.01)

(58) Field of Classification Search
CPC ..... H04W 84/18; H04W 88/04; H04W 8/005; H04W 40/22; H04W 72/0446
USPC ........................................................ 370/350
See application file for complete search history.

(56) References Cited

U.S. PATENT DOCUMENTS

2013/0301633 A1* 11/2013 Brown .................. H04J 3/0647
370/350
2014/0044036 A1    2/2014  Kim et al.
2014/0153444 A1    6/2014  Zhou et al.

FOREIGN PATENT DOCUMENTS

| JP | 2016-507944 A | 3/2016 |
| KR | 10-2012-0112637 A | 10/2012 |
| WO | WO 99/48003 A2 | 9/1999 |
| WO | WO 2013/111104 A | 8/2013 |
| WO | WO 2013/129673 A1 | 9/2013 |

OTHER PUBLICATIONS

Catt, "Detailed Signaling Flows for D2D Discovery," 3GPP TSG RAN WG2 Meeting #86, R2-142103, Seoul, Korea, May 19-23, 2014, pp. 1-4.

Intel Corporation, "Resource allocation signaling for D2D discovery," 3GPP TSG-RAN WG2 #86, R2-142050, Seoul, Korea, May 19-23, 2014, pp. 1-3.

Samsung, "Pertomiance of flat and hierarchical synchronization schemes," 3GPP TSG RAN WG1 Meeting ∩78bis, R1-143855, Ljubljana, Slovenia, Oct. 6-10, 2014, 7 pages.

* cited by examiner (A) CONTROL-PLANE PROTOCOL STACK (B) USER-PLANE PROTOCOL STACK

METHOD FOR RELAYING DISCOVERY SIGNAL FOR TERMINAL-TO-TERMINAL DIRECT COMMUNICATION IN WIRELESS COMMUNICATION SYSTEM, AND APPARATUS THEREFOR

CROSS REFERENCE TO RELATED APPLICATIONS

This application is the National Phase of PCT International Application No. PCT/KR2015/005714, filed on Jun. 8, 2015, which claims priority under 35 U.S.C. 119(e) to U.S. Provisional Application No. 62/011,001, filed on Jun. 11, 2014, all of which are hereby expressly incorporated by reference into the present application.

TECHNICAL FIELD

The present invention relates to a wireless communication system, and more particularly to a method and apparatus for relaying a discovery signal for Device-to-Device communication (D2D) in a wireless communication system.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE

Technical Problem

An object of the present invention is to provide a method and apparatus for relaying a discovery signal for D2D communication in a wireless communication system.

Technical Solution

The object of the present invention can be achieved by providing a method for allowing a user equipment (UE) to relay a discovery signal for Device-to-Device communication (D2D) in a wireless communication system including: detecting a plurality of discovery signals transmitted from the same source user equipment (UE); determining whether one of the plurality of discovery signals will be relayed on the basis of a first hop count contained in the plurality of discovery signals; and if relaying of the one discovery signal is determined, relaying the one discovery signal to another user equipment (UE), wherein the second hop count contained in the one relayed discovery signal is increased or reduced on the basis of the first hop count.

The determining whether the one discovery signal will be relayed may include: if all the first hop counts contained in the plurality of discovery signals are identical to each other, deciding to relay the discovery signals. The determining whether the one discovery signal will be relayed may include: selecting a discovery signal having the lowest reception quality from among the plurality of discovery signals as the single relayed discovery signal.

In another aspect of the present invention, a user equipment (UE) for performing Device-to-Device communication (D2D) in a wireless communication system includes: a radio frequency (RF) communication module configured to transmit/receive a signal to and from another UE or a network; and a processor configured to process the signal. The processor detects a plurality of discovery signals transmitted from the same source UE, decides to relay one of the plurality of discovery signals on the basis of a first hop count contained in the plurality of discovery signals, and controls the RF communication module to relay the single discovery signal to another UE. The processor increases or decreases the second hop count contained in the single relayed discovery signal on the basis of the first hop count.

If all the first hop counts contained in the plurality of discovery signals are identical to each other, the processor may decide to relay the discovery signals. The processor may select a discovery signal having the lowest reception quality from among the plurality of discovery signals as the single relayed discovery signal.

A first resource for transmitting the discovery signal and a second resource for relaying the discovery signal may be established separately from each other; and a maximum number of transmission times of the discovery signal through the first resource and a maximum number of relaying times of the discovery signal through the second resource may be independently established.

The single relayed discovery signal may be relayed using resources commonly used in all UEs, and the common resources may be changed according to time. The single relayed discovery signal may include reception quality information of the single discovery signal.

Advantageous Effects

As is apparent from the above description, the embodiments of the present invention can more efficiently relay and transmit a discovery signal for D2D communication.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

Figure 1:
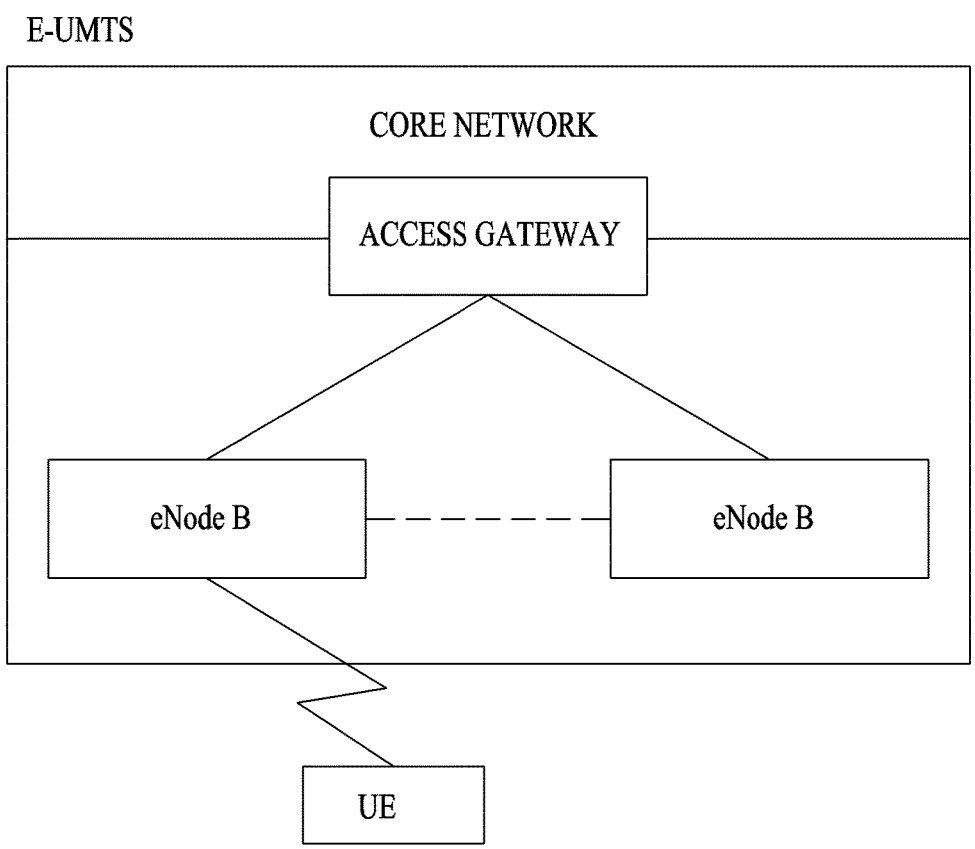
FIG. 1 is a diagram schematically illustrating a network structure of an E-UMTS as an exemplary wireless communication system.
Figure 2:
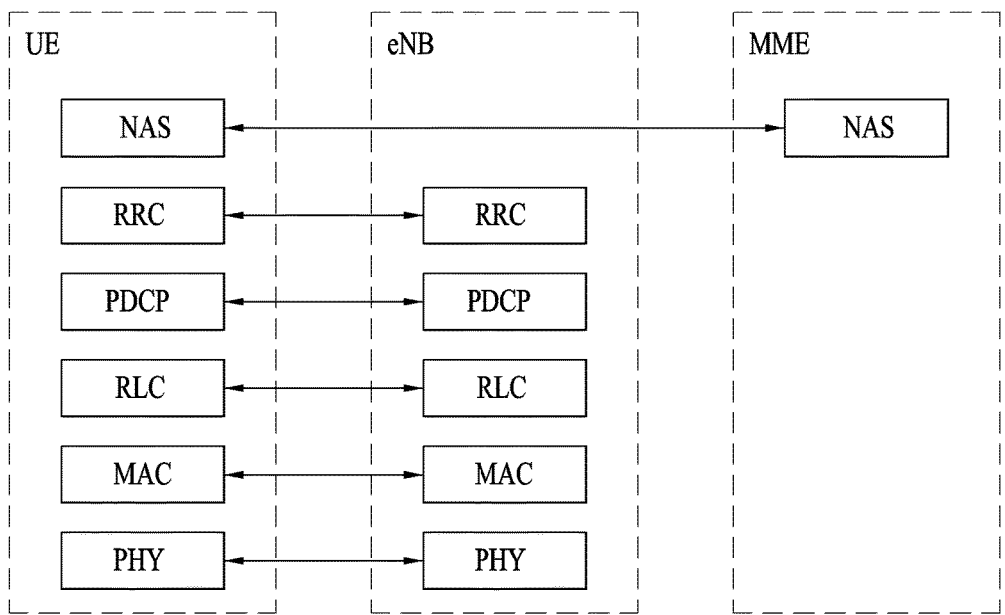
FIG. 2 is a diagram illustrating structures of a control plane and a user plane of a radio interface protocol between a UE and an E-UTRAN based on the 3GPP radio access network specification.
Figure 2:
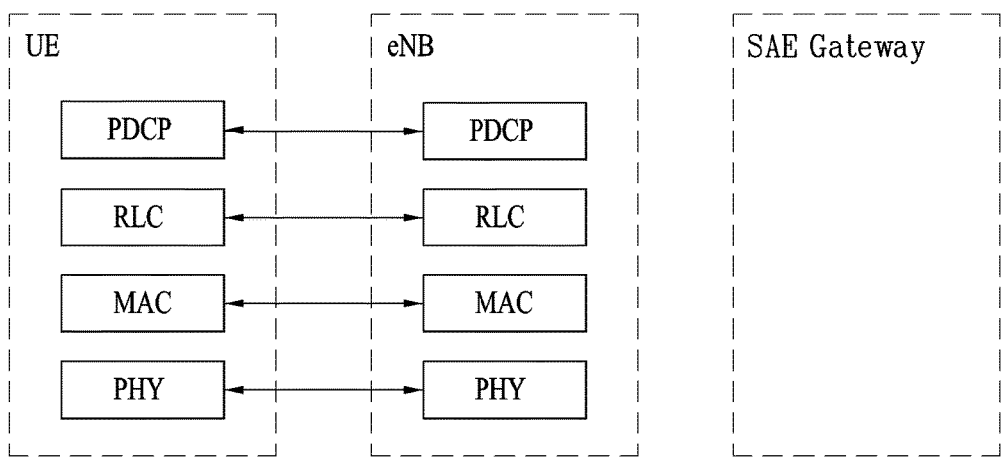

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.25, 2.5, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
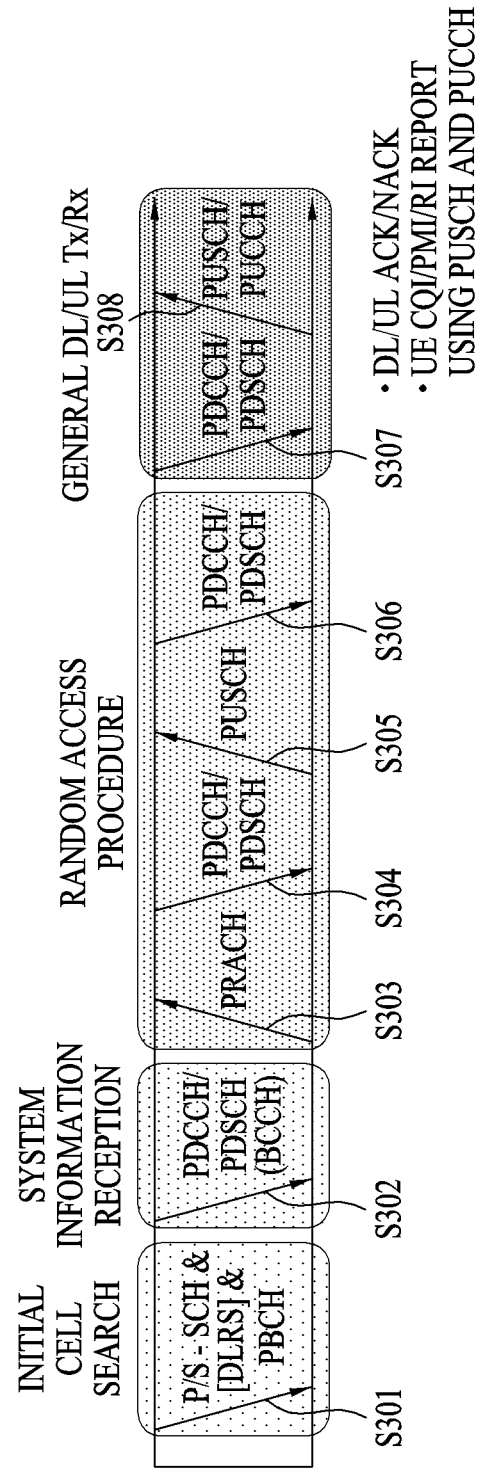
FIG. 3 is a diagram illustrating physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
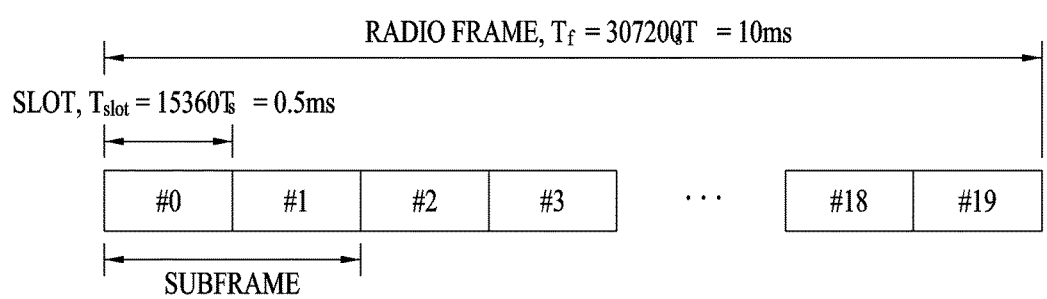
FIG. 4 is a diagram illustrating a radio frame used in an LTE system.

FIG. 4 is a diagram for a structure of a radio frame in LTE system.

Referring to FIG. 4, one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times T_s$). In this case, $T_s$ indicates a sampling time and is represented as $T_s = 1/(15 \text{ kHz} \times 2048) = 3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
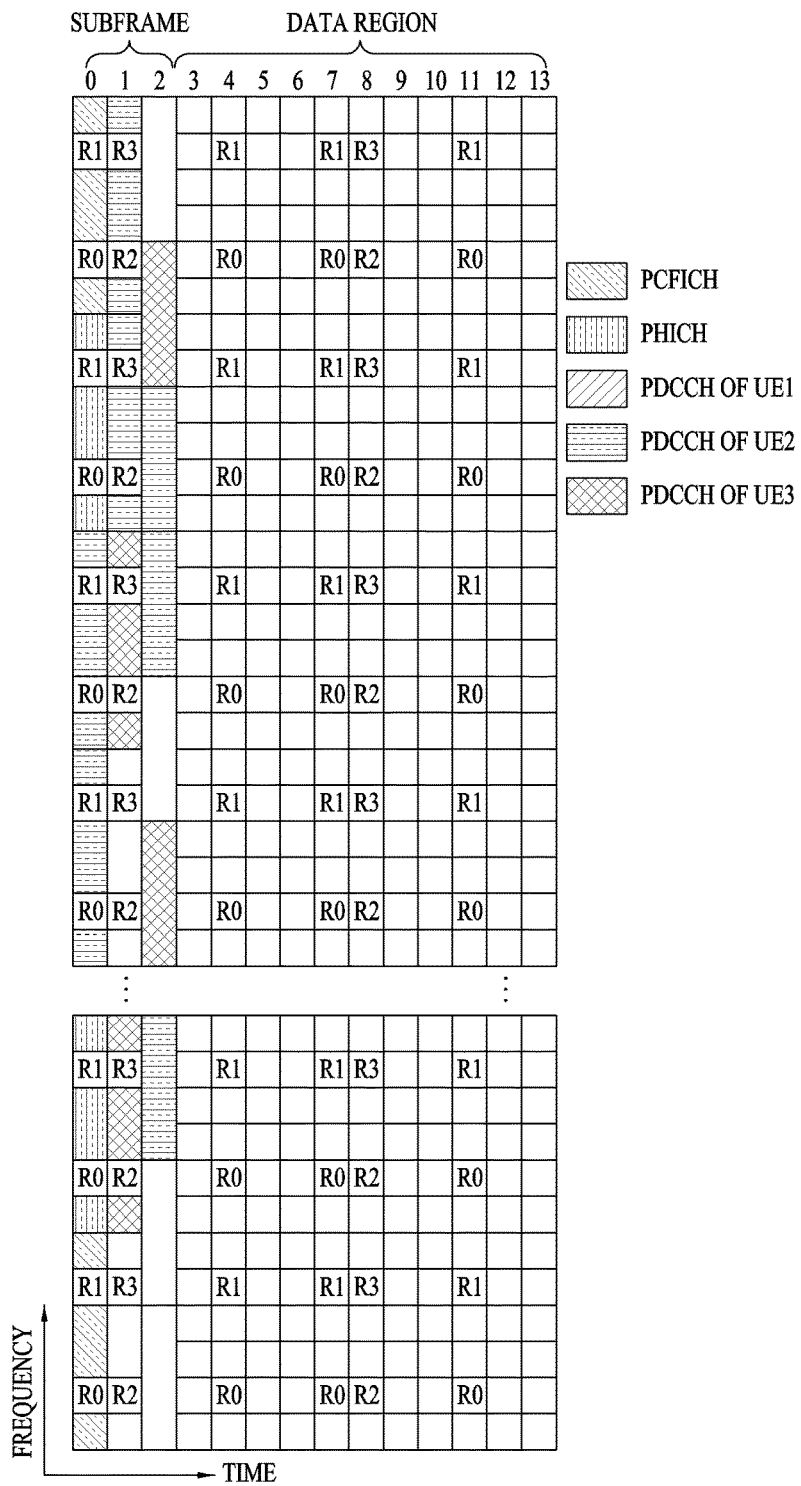
FIG. 5 is a diagram illustrating the structure of a downlink (DL) radio frame used in an LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., a frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
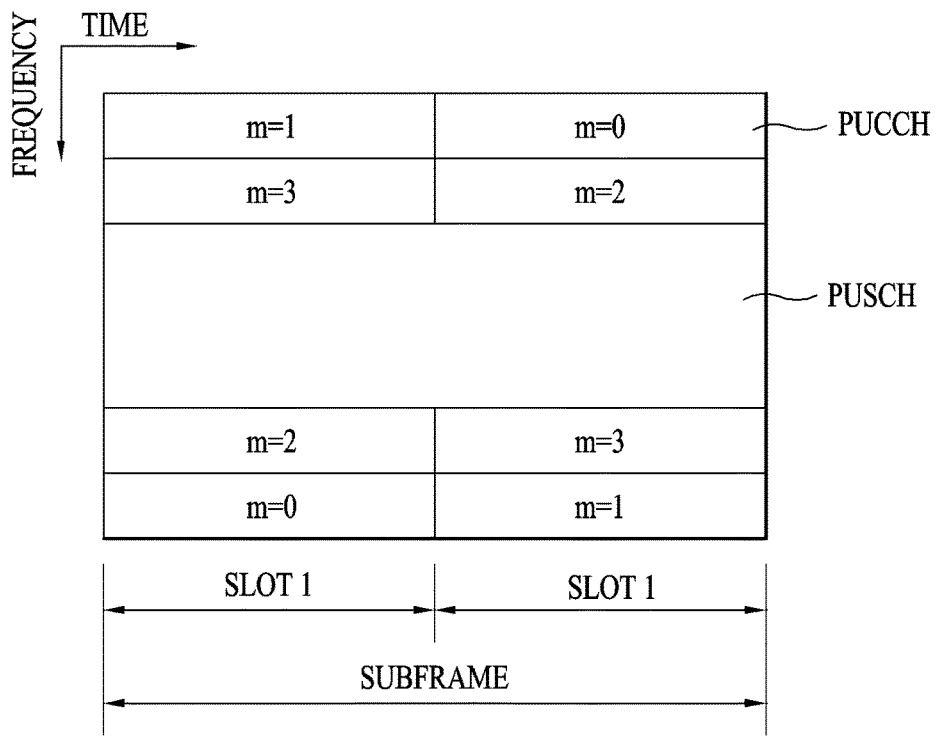
FIG. 6 is a diagram illustrating the structure of an uplink (UL) subframe in an LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

Figure 7:
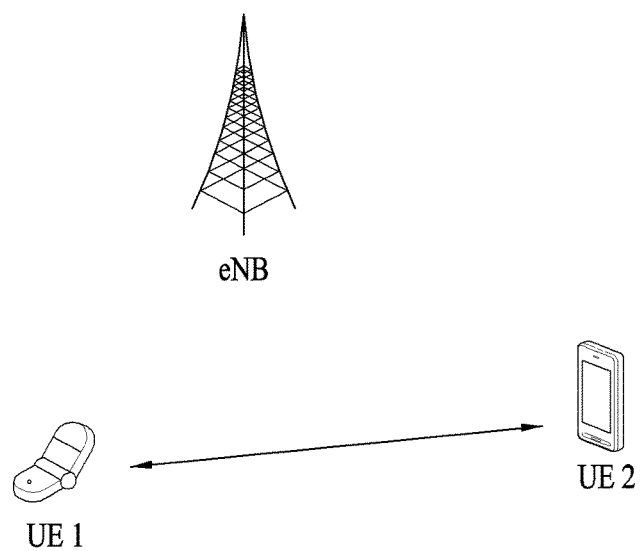
FIG. 7 is a conceptual diagram illustrating D2D communication.

FIG. 7 is a conceptual diagram for device-to-device direct communication.

Referring to FIG. 7, in a D2D (device-to-device) communication that a UE performs direct wireless communication with a different UE, an eNB can transmit a scheduling message for indicating D2D transmission and reception in the device-to-device direct communication. A UE participating in the D2D communication receives a D2D scheduling message from the eNB and performs a transmission and reception operation indicated by the D2D scheduling message. In this case, although the UE indicates a terminal of a user, if such a network entity as an eNB transmits or receives a signal according to a communication scheme between UEs, the network entity can be regarded as a sort of UEs. In the following, a link directly linked between UEs and a link for communicating between a UE and an eNB are referred to as a D2D link and an NU link, respectively.

Meanwhile, a discovery signal indicating the presence of a user equipment (UE) may be used as a kind of the D2D signal. This discovery signal includes a UE identifier (ID), and the receive (Rx) UE having detected the UE ID can recognize that a UE having transmitted the corresponding discovery signal is present in a detectable region (i.e., a discovery coverage).

The discovery coverage of the discovery signal transmitted through a radio frequency (RF) channel is limited by Tx power of the UE, a route state related to the Rx UE, and interference level of the Rx UE. Specifically, assuming that the Tx power of the discovery signal is limited due to an interference problem related to a general NU link signal transmitted using different frequency resources at the same time point, discovery coverage is greatly reduced in size. Therefore, although two UEs desired to discover each other are relatively contiguous to each other, the discovery coverage is limited, such that the discovery process may fail or a long period of time may be consumed to successfully perform the discovery process (i.e., detection is successfully performed after transmission and reception of several discovery signals).

The above-mentioned issues may be solved when another UE performs relaying of the discovery signal.

Figure 8:
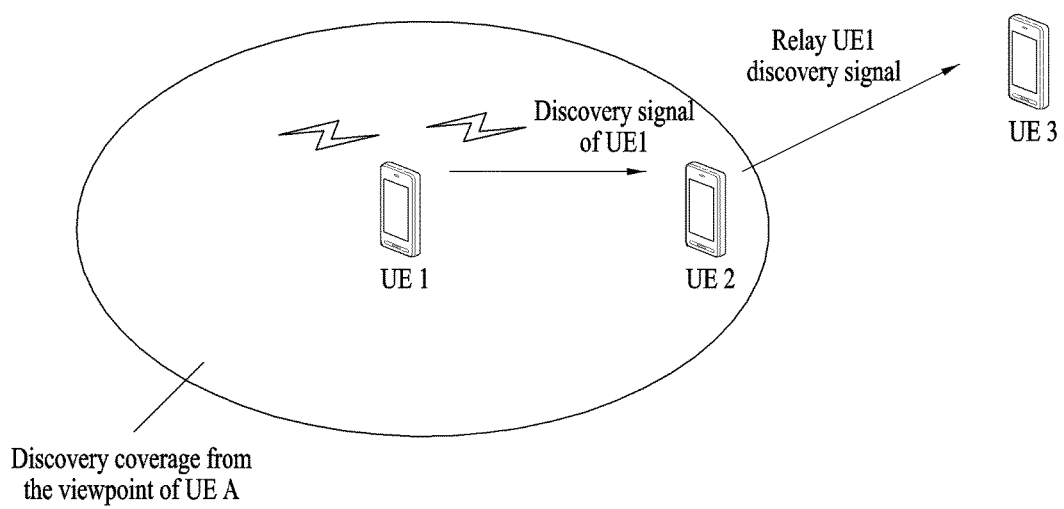
FIG. 8 is a conceptual diagram illustrating a relaying process of a discovery signal according to an embodiment of the present invention.

FIG. 8 is a conceptual diagram illustrating a relaying process of a discovery signal according to an embodiment of the present invention.

Referring to FIG. 8, when UE1 transmits the discovery signal, UE2 having received the discovery signal performs relaying so that UE3 located in the place in which UE3 has difficulty in directly receiving the discovery signal can discover UE1. In order to facilitate such discovery relaying, there is a need to define various UE operations (for example, decision whether the discovery signal is a relayed signal, selection whether the discovery signal is to be relayed, decision of resources to be used for relaying of the discovery signal, and the operation for detecting the relayed discovery signal).

For convenience of description, when UE2 performs relaying of the UE1 discovery signal initially transmitted from the UE1 as shown in FIG. 8, the UE1 will hereinafter be referred to as a source UE of the corresponding discovery signal.

Method for Determining Whether the Discovery Signal is a Relayed Signal>

First of all, a method for determining whether the discovery signal is a relayed signal will hereinafter be described in detail. The discovery signal relayed by another UE may be distinguished from the discovery signal directly transmitted from the corresponding UE. As a result, the UE having received the discovery signal may recognize whether the corresponding source UE is within the 1-hop discovery range because the corresponding discovery signal is directly received from the original source UE, or may recognize whether the source UE is located outside the 1-hop discovery range because the corresponding discovery signal is relayed from another UE.

In more detail, assuming that the discovery signal initially transmitted from the source UE is denoted by Hop Count #0, relaying of the discovery signal corresponding to Hop Count #n may be defined as Hop Count #n+1. In order to prevent the discovery signal from being relayed during many hops, the upper limit of the hop count may be limited to N. This means that the discovery signal having "Hop Count=N" is no longer relayed.

As the method for designating the hop count of the discovery signal, one or more combinations of the following methods 1) to 4) may be used.

1) Hop Count may be designated using some bits within the discovery message.

2) The bit stream masked with CRC applied to the discovery message may be determined in different ways according to the hop count. Therefore, the Rx UE may perform masking the CRC for each hop count in different ways, and may perform the CRC checking process. Finally, it is assumed that the hop count corresponding to the mask assumed when passing through the CRC process is a hop count of the corresponding discovery message.

3) The scrambling sequence of the discovery message and/or the seed value of the DM-RS sequence may be determined in different ways according to the hop count.

4) A resource pool for the discovery signal is separated according to the hop count, so that only the discovery signal of a specific hop count can be transmitted within the corresponding resource pool.

Specifically, each discovery signal may have the upper limit of a unique hop count, because the coverage to be discovered for each UE configured to transmit the discovery signal may have different sizes. In order to support the above-mentioned operation, each discovery signal may add a maximum hop count value to a current hop count. That is, assuming that a current hop count of the corresponding signal is identical to the maximum hop count after a specific UE receives a specific discovery signal, the corresponding signal is no longer relayed.

Alternatively, the hop count is reduced one by one whenever the discovery signal is relayed. That is, the source UE may establish the maximum hop count (N) to the hop count, and may transmit the established hop count. Thereafter, the UE having received the discovery signal having "Hop Count=N" may set the hop count to "Hop Count=N−1" whenever the discovery signal is relayed. The discovery signal having "Hop Count=0" is no longer relayed. In this case, the hop count may indicate the number of remaining hops to be relayed in the future.

In the meantime, an approximate distance to the source UE may be measured on the basis of the Rx signal quality of the discovery signal. That is, assuming that signal power of the discovery signal detected by a specific UE is high, the fact that the distance to the source UE having transmitted the corresponding discovery signal is relatively short can be recognized. In order to perform the above-mentioned operation even in the relaying situation of the discovery signal, the UE configured to perform relaying of the discovery signal may include signal quality information obtained when the UE receives the corresponding signal in the discovery signal.

Referring to FIG. 8, when UE2 detects the UE1 discovery signal corresponding to the source UE, UE2 may include power information of the UE1 transmission discovery signal received by the UE2 when relaying the UE1 discovery signal to UE3. UE3 may estimate the distance between UE2 and UE3 on the basis of Rx power of the discovery signal relayed by UE2, and the distance between UE1 and UE2 may be estimated on the basis of UE2 Rx power information contained in the corresponding discovery signal. By combination of the above-mentioned results, the approximate distance between UE1 and UE3 may be estimated. Although the above-mentioned example has disclosed that Rx power of the discovery signal is used as information indicating the distance between UE and another UE, if the UE can directly measure the distance to another UE, the measured distance may be added to the relay signal and then transmitted. Assuming that UE2 can measure the distance to UE1, the measurement value is added so that the UE1 discovery signal can be relayed.

Although the following description assumes that the hop count increases one by one simultaneously while being relayed, the scope or spirit of the present invention is not limited thereto, and it should be noted that the hop count is appropriately modified to be decreased one by one simultaneously while being relayed (for example, a minimum hop count is modified into a maximum hop count).

<Information as to Whether the Discovery Signal is Relayed>

A method for selecting the discovery signal to be relayed will hereinafter be described. In brief, although all detected discovery signals not reaching the maximum hop count are relayed, this method encounters the occurrence of relaying of numerous discovery signals, such that UE power consumption and discovery signal resource consumption are unavoidably increased. Therefore, a method for adjusting each discovery signal to be relayed an appropriate number of times is needed.

For convenience of description, it is assumed that UE A detects the discovery signal in which UE B is used as a source UE. If necessary, UE A may repeatedly detect the discovery signal in which the same UE B is used as a source UE during a predetermined time section. Although all the detected discovery signals have the same hop counts, the hop count values of some parts of the discovery signals may be different from those of some other parts. In this case, UE A may use distribution of the hop counts of the discovery signals detected during the corresponding time section as a reference for determining whether the discovery signal of UE B will be relayed.

First of all, the following description assumes that the hop counts of the discovery signals of all detected UE Bs are identical to "n".

Figure 9:
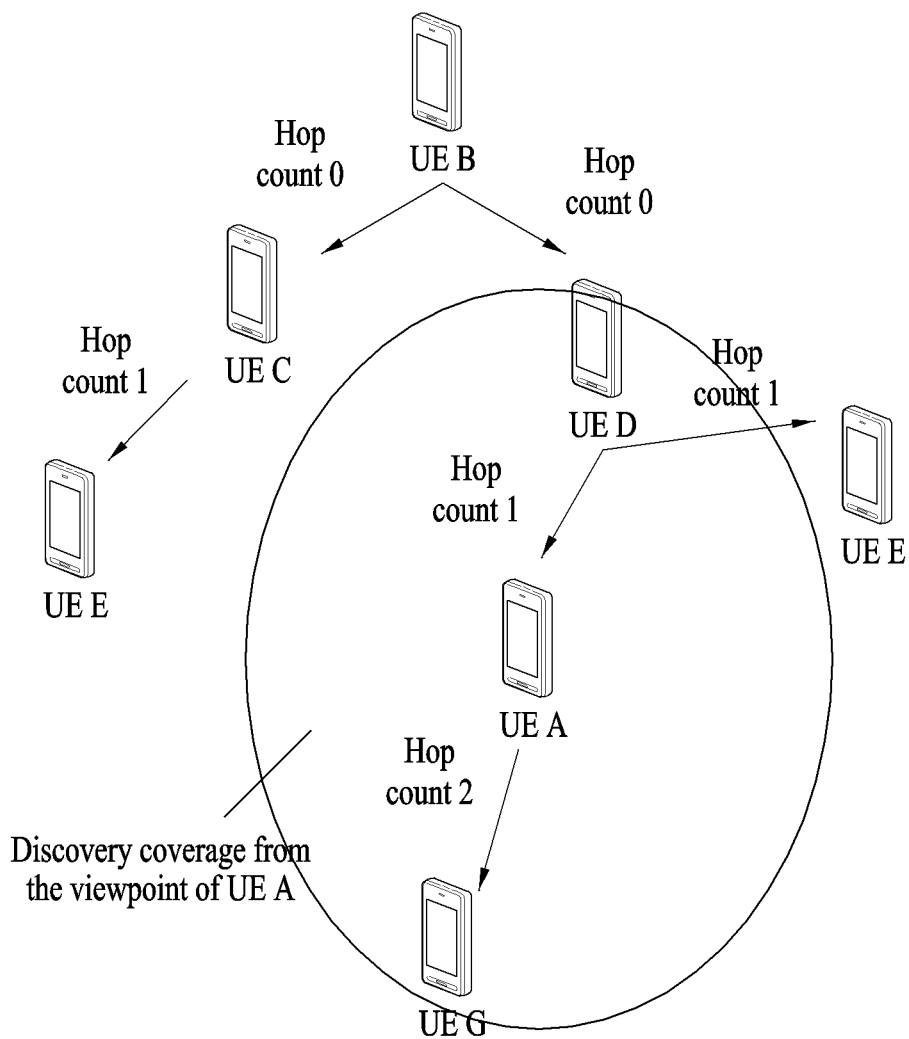
FIG. 9 is a conceptual diagram illustrating that hop counts of discovery signals received from a source UE are identical to each other according to an embodiment of the present invention.

FIG. 9 is a conceptual diagram illustrating that hop counts of discovery signals received from a source UE are identical to each other according to an embodiment of the present invention.

Referring to FIG. 9, the discovery signals of all detected UE Bs have the same hop count "1", and UE A may be located in the vicinity of the exterior border of the hop (n) during relaying of the UE B discovery signals. Therefore, UE A may determine that only the UE A can relay the discovery signals and other UEs cannot relay the discovery signals, such that the UE A may decide to relay the corresponding discovery signal so as to extend to the next hop, and may set the hop count of the relayed signal to (n+1).

It is assumed that some parts of the discovery signals of the detected UE B are denoted by "n", and some other parts of the discovery signals of the detected UE B are denoted by "n+1".

Figure 10:
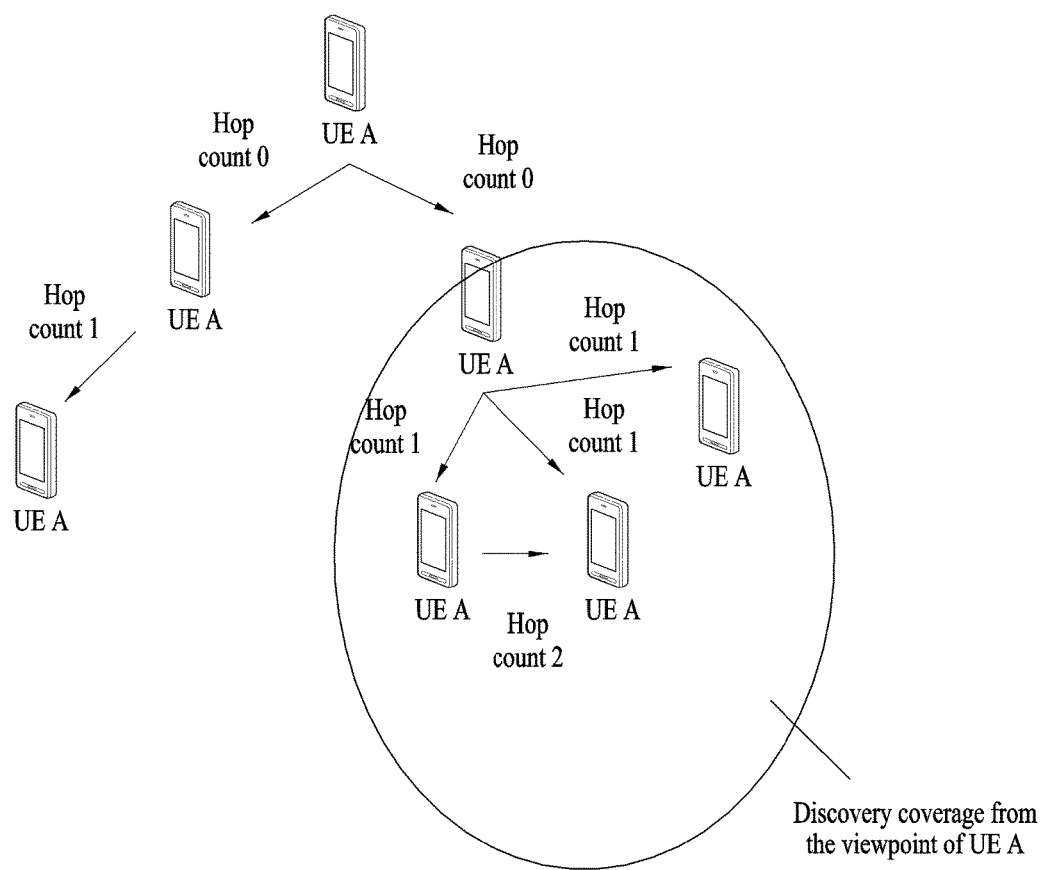
FIG. 10 is a conceptual diagram illustrating different discovery signals received from the source UE.

FIG. 10 is a conceptual diagram illustrating different discovery signals received from the source UE according to an embodiment of the present invention.

Referring to FIG. 10, assuming that the number of hop counts of the discovery signal of the detected UE B is 1 or 2, it is determined that UE A may be located between two hop counts. Therefore, the discovery signal need not be relayed, because it is expected that another UE located at the border between the hop count (n) and the hop count (n+1)

can relay the corresponding signal. For example, it is more preferable that UE E or UE G may perform relaying as shown in FIG. 10.

Meanwhile, although detecting the discovery signal of another UE indicates that the corresponding signal is successfully decoded, this means that Rx power of the corresponding signal is equal to or higher than a predetermined power level so that two UEs are located close to each other As an alternative or countermeasure of the above-mentioned hop count distribution based decision method, relaying or non-relaying may be determined on the basis of the Rx quality of the discovery signal. For example, UE A may temporarily determine relaying of the smallest hop count signal from among the UE-B discovery signals detected within a predetermined time section, and may finally determine relaying or non-relaying on the basis of the Rx quality of the smallest hop count signal. Of course, when several signals are detected as the smallest hop count, the strongest Rx signal may be used as a reference.

In more detail, UE A may stochastically determine relaying or non-relaying of the discovery signal of UE B. In this case, the probability of relaying may be reduced in proportion to the increasing Rx signal quality. If the Rx signal has a high quality, UE A may determine that a more distant UE is scheduled to perform relaying and reduces the relaying probability. In this case, the operation for stochastically performing relaying may indicate that transmission or non-transmission of the relay signal is determined at a predetermined probability at each relaying time point. In this case, the relaying time may be defined on the basis of the resource pool, or may indicate the discovery signal transmission time within the resource pool. The same principles may also be applied even when UE A determines the discovery signal relaying time of UE B. That is, as the Rx signal quality becomes higher, the relaying attempt start time is more delayed.

During execution of the series of the above-mentioned operations, assuming that UE A detects the UE-B discovery signal having the hop count to be established in the relaying signal, it is determined that another UE more distant from UE A performs relaying of the corresponding discovery signal, and may cancel the scheduled relaying.

In the meantime, the number of discovery signals to be relayed by one UE may be an excessively high number. In this case, one UE may limit the number of signals relayed within one discovery period, so that the overall interference level within the discovery resource pool can be maintained. If the number of signals to be relayed by a specific UE exceeds a predetermined threshold value, the UE must select some parts of the signals. Although this selection is stochastically achieved, the discovery signal to be recently relayed may be primarily excluded, and/or the discovery signal having more superior signal quality may be primarily excluded. Specifically, the number of UEs participating in relaying increases in proportion to the increasing number of hop counts, and the probability of indicating relaying or non-relaying is established in different ways according to the hop counts, such that the discovery signal having a high hop count may be relayed at a relatively low probability.

<Method for Determining Resources to be Used for Relaying of the Discovery Signal>

A method for determining resources to be used for relaying of the discovery signal will hereinafter be described. Generally, there are two methods for determining resources to be used for transmission of the discovery signal. A first method may allow the transmission (Tx) UE to autonomously determine appropriate resources within the resource pool designated by the eNB. The first method will hereinafter be referred to as UE autonomous selection. A second method may allow the eNB to indicate which resources will be directly used for each Tx UE using UE specific signaling. The second method will hereinafter be referred to as eNB allocation. The relaying operation of the discovery signal may also be designed according to the two kinds of methods.

In accordance with the UE autonomous selection method, a certain UE may relay the discovery signal. Information as to which discovery signal will be selected as the relay signal by each UE may be based on the above-mentioned operation. Generally, the UE configured not to perform the relaying operation may allow a maximum of N transmission actions in the resource pool within a single discovery resource period. In this case, N transmission actions may be used to transmit the discovery signal in which the UE is used as a source UE. If the initially transmitted discovery signal and the relayed discovery signal are not separated from each other by a separate resource pool, one of the following methods may be selected.

a) Each UE may have the same maximum number (N) of transmission (Tx) times within the single resource pool, irrespective of relaying or non-relaying. Within the limitation of the maximum number of transmission times, the UE can properly distribute initial transmission of its own discovery signal and relaying transmission of the discovery signal of another UE. This method has advantages in that the amount of resources consumed by the UE is maintained. However, the UE participating in the relaying operation may lose the opportunity of transmitting its own signal.

b) Each UE may have first limitation (L) regarding the number of transmission times of its own signal and second limitation (M) regarding the number of relaying times of the signal of another UE. Preferably, L+M corresponding to the total number of discovery signal transmission times may be higher than N. Of course, L may be identical to N, such that the number of transmission times of the discovery signal in which the UE is used as a source UE may be maintained constantly, irrespective of relaying or non-relaying.

If the discovery signal is relayed for only one hop (1 hop) or longer, the total number of transmission times of all discovery signals relayed by one UE is limited to M. However, separate limitation is assigned to each hop count, the number of relaying times of the hop count (n) is limited to Mn, and M may be considered to be a total sum of Mn values. If the latter method is selected, the number of relaying times for each hop count may be adjusted.

Needless to say, assuming that the initially transmitted discovery signal and the relayed discovery signal are separated from each other by a separate resource pool, the number of transmission times within each resource pool may be limited, and the discovery signal relay resource pool to be used according to the hop count may be independently designated.

Meanwhile, according to the eNB allocation method, the eNB may allocate resources to each UE, and the UE may use the corresponding resources to transmit the discovery signal. Even in the case, the following methods may also be used in a similar way.

1) eNB may allocate a series of discovery resources to a specific UE without distinction in eNB usage. However, the eNB may command a specific UE to determine whether the discovery signal will be relayed. The UE may use some parts of the discovery resources to initially transmit the discovery signal in which the UE is used as a source UE, and the remaining parts of the discovery resources may be used to relay the discovery signal of another UE. The number of use times for each usage may be limited as described above.

2) eNB may designate not only the resource used for initial transmission of the discovery signal in which the UE is used as a source UE, but also the resource used for relaying of the discovery signal of another UE, separately from each other. Needless to say, when the discovery signal is relayed for 1 hop or longer, the resource to be used for each hop count may also be separately designated.

In addition, assuming that different UEs perform relaying of the same discovery signal using different resources, the number of resources consumed for such relaying may be excessively high. In this case, when different UEs relay the same discovery signals, the same resources may be used by different UEs. In this case, the same discovery signal may indicate a signal having not only the same information regarding the source UE but also the same hop count.

In this case, signals transmitted from two UEs are combined over a radio frequency (RF) channel. From the viewpoint of the reception (Rx) UE, the reception (Rx) UE may consider that one UE transmits signals through the plurality of antennas. Specifically, in order to perform the above operation in the UE autonomous selection, the position of resources used when the specific discovery signal is relayed needs to be derived from the discovery signal.

That is, assuming that a specific UE detects and relays a specific discovery signal, the information bit string transmitted through the corresponding discovery signal may be used to apply a predetermined special function, and the corresponding output value may be used to determine the position of relay resources. In this case, if different hop counts are used although the bit string relates to the discovery signal based on the same source UE, the bit string may be relayed using different resources.

Generally, since the number of resources in one discovery resource pool is limited, the total number of bit strings of the available discovery signal may be higher than the number of discovery signal resources. (Assuming that one discovery signal transmits a message of K bits, the number of available bit strings is denoted by 2K). Therefore, the function for deriving the position of the discovery signal resource from the bit string of the discovery signal may be constructed in the shape of a multi-to-one function. In this case, in order to prevent different discovery signals from being continuously relayed using the same resources, the function for deriving the resource position of the discovery signal from the bit string of the discovery signal must have time-variable attributes.

In more detail, the resource position of the discovery signal may be changed according to the index or SFN (System Frame Number) of the discovery resource pool and the same time resource index. For example, a plurality of functions for deriving the resource position of the discovery signal may be determined in advance, and a specific function is selected at a specific time so that the resource position can be derived.

<The Operation for Detecting the Relayed Discovery Signal>

Meanwhile, the discovery signal of the same source UE may be detected simultaneously while having different hop counts in the single discovery period. In this case, when the detected discovery signal is reported in the direction from the lower layer (e.g., physical layer or MAC layer) of the reception (Rx) UE to the upper layer (e.g., the application layer), the operation for performing reporting of plural equal source UEs may cause unnecessary upper layer processing.

Therefore, the hop count has information regarding the distance to the source UE, so that reporting only one representative hop count may be reported. More preferably, only the discovery signal corresponding to a minimum number of hop counts corresponding to the shortest hop to the source UE may be reported. If the reception quality of the discovery signal is also reported to measure the distance to the discovery signal transmission UE using power of the Rx signal, the quality of the discovery signal corresponding to the minimum number of hop counts may be reported.

Although the above-mentioned D2D signal relaying operation has been disclosed centering around the discovery signal that has a relatively small amount of overhead and is intermittently transmitted so that resource consumption and power consumption caused by such relaying are limited, the scope or spirit of the present invention is not limited thereto. Whereas general user data has a small amount of overhead as in the notification message indicating the emergency situation and is intermittently transmitted, relaying of D2D data having coverage to be rapidly extended may be considered more efficient according to the above-mentioned principles.

Figure 11:
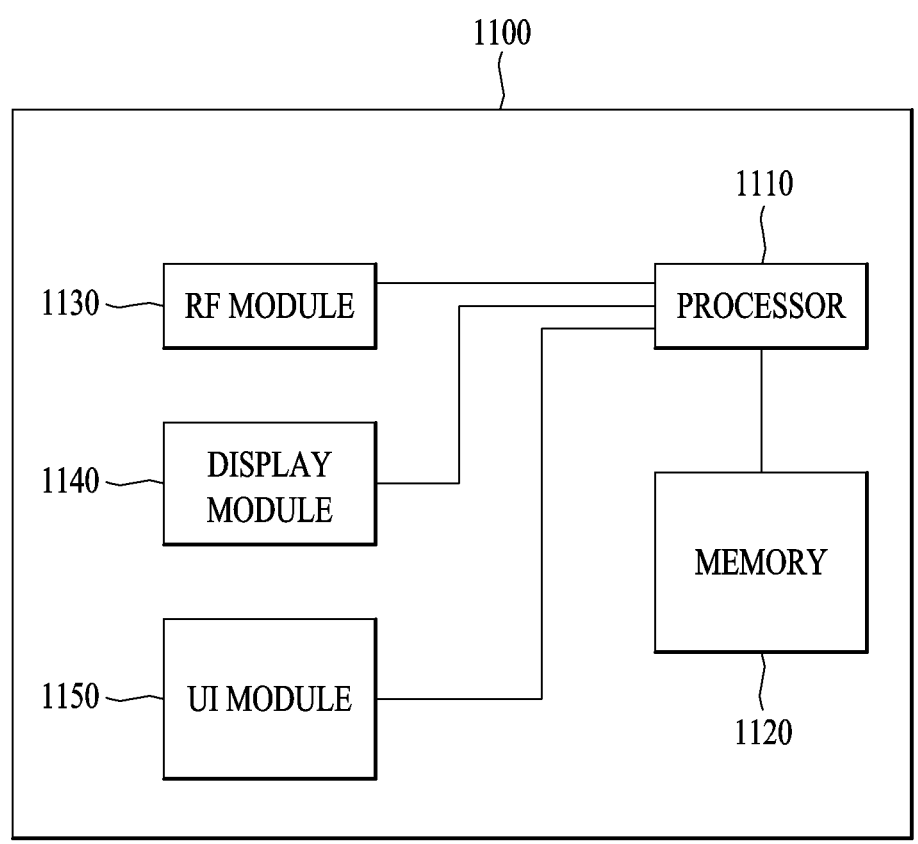
FIG. 11 is a block diagram illustrating a communication device according to an embodiment of the present invention.

FIG. 11 is a block diagram illustrating a communication device according to an embodiment of the present invention.

In FIG. 11, the communication device 1100 includes a processor 1110, a memory 1120, a Radio Frequency (RF) module 1130, a display module 1140, and a user interface (UI) module 1150.

The communication device 1100 is disclosed for illustrative purposes only and certain modules may also be omitted from the communication device 1100 as necessary. In addition, the communication device 1100 may further include necessary modules. Some modules of the communication device 1100 may be identified as more detailed modules. The processor 1110 is configured to carry out the operations of the embodiments of the present invention. For detailed operations of the processor 1110 reference may be made to FIGS. 1 to 10.

The memory 1120 is connected to the processor 1110, and stores an operating system, applications, program code, data and the like. The RF module 1130 is connected to the processor 1110 and converts a baseband signal into a radio frequency (RF) signal, or converts the RF signal into the baseband signal. For these operations, the RF module 1130 performs analog conversion, amplification, filtering, and frequency up-conversion in order or performs such operations in reverse order. The display module 1140 is connected to the processor 1110 and displays a variety of information. The scope or spirit of the display module 1140 of the present invention is not limited thereto, and the display module 1140 may be any of well-known elements, for example, a Liquid Crystal Display (LCD), a Light Emitting Diode (LED), an Organic Light Emitting Diode (OLED) and the like. The user interface (UI) module 1150 is connected to the processor 1110, and may be implemented as a combination of user interfaces such as a keypad, a touchscreen, etc.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As is apparent from the above description, although the method and apparatus for relaying the discovery signal for D2D communication in a wireless communication system have been disclosed on the basis of application to 3GPP LTE, the inventive concept of the present invention is applicable not only to 3GPP LTE, but also to other mobile communication systems.

The invention claimed is:

1. A method for allowing a user equipment (UE) to relay a discovery signal for device-to-device (D2D) communication in a wireless communication system, the method performed by the UE and comprising:
 detecting a plurality of discovery signals transmitted from a same source UE;
 determining first discovery signals for relaying within a discovery period among the plurality of discovery signals, based on a first hop count contained in each of the plurality of discovery signals; and
 relaying at least one of the first discovery signals to another UE,
 wherein a second hop count contained in each of the at least one of the first discovery signals is increased or reduced based on the first hop count,
 wherein, when a number of the first discovery signals is greater than a predetermined value, at least one second discovery signal is selected for relaying to the another UE among the first discovery signals based on a probability that each of the first discovery signals is selected as the at least one second discovery signal,
 wherein a number of the at least one second discovery signal is equal to the predetermined value, and
 wherein the probability that each of the first discovery signals is selected as the at least one second discovery signal increases based on a third hop count contained in each of the first discovery signals.

2. The method according to claim 1, wherein the determining the first discovery signals includes:
 when all of the first hop counts contained in the plurality of discovery signals are identical to each other, deciding to relay all of the plurality of discovery signals.

3. The method according to claim 1, further comprising:
 independently establishing a first resource for transmitting a discovery signal of the UE and a second resource for relaying the at least one of the first discovery signals; and
 independently establishing a maximum number of transmission times of the discovery signal of the UE through the first resource and a maximum number of relaying times of the at least one of the first discovery signals through the second resource.

4. The method according to claim 1, wherein:
 the at least one of the first discovery signals is relayed using resources commonly used in all UEs, and
 the common resources are changed according to time.

5. The method according to claim 1, wherein the at least one of the first discovery signals includes reception (Rx) quality information of the at least one of the first discovery signals.

6. A user equipment (UE) for performing device-to-device (D2D) communication in a wireless communication system, the UE comprising:
 a transceiver configured to transmit and receive a signal to and from another UE or a network; and
 a processor configured to process the signal,
 wherein the processor is further configured to:
 detect a plurality of discovery signals transmitted from a same source UE,
 determine first discovery signals for relaying within a discovery period among the plurality of discovery signals based on a first hop count contained in each of the plurality of discovery signals, and
 control the transceiver to relay at least one of the first discovery signals to another UE,
 wherein the processor increases or decreases a second hop count contained in each of the at least one of the first discovery signals based on the first hop count,
 wherein, when a number of the first discovery signals is greater than a predetermined value, at least one second discovery signal is selected for relaying to the another UE among the first discovery signals based on a probability that each of the first discovery signals is selected as the at least one second discovery signal,
 wherein a number of the at least one second discovery signal is equal to the predetermined value, and wherein the probability that each of the first discovery signals is selected as the at least one second discovery signal increases based on a third hop count contained in each of the first discovery signals.

7. The UE according to claim 6, wherein:
when all of the first hop counts contained in the plurality of discovery signals are identical to each other, the processor decides to relay all of the plurality of discovery signals.

8. The UE according to claim 6, wherein:
a first resource for transmitting a discovery signal of the UE and a second resource for relaying the at least one of the first discovery signals are established separately from each other; and
a maximum number of transmission times of the discovery signal of the UE through the first resource and a maximum number of relaying times of the at least one of the first discovery signals through the second resource are independently established.

9. The UE according to claim 6, wherein:
the at least one of the first discovery signals is relayed using resources commonly used in all UEs, and
the common resources are changed according to time.

10. The UE according to claim 6, wherein the at least one of the first discovery signals includes reception quality information of the at least one of the first discovery signals.

* * * * *